(12) United States Patent
Dutrey et al.

(10) Patent No.: US 11,722,084 B2
(45) Date of Patent: Aug. 8, 2023

(54) BACKSPINNING MOTOR CONTROL

(71) Applicant: Schneider Toshiba Inverter Europe SAS, Pacy sur Eure (FR)

(72) Inventors: Alain Dutrey, Fontaine sous Jouy (FR); Thomas Devos, Carrières sous Poissy (FR); François Malrait, Jouy sur Eure (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 0 days.

(21) Appl. No.: 17/391,131

(22) Filed: Aug. 2, 2021

(65) Prior Publication Data
US 2022/0045639 A1    Feb. 10, 2022

(30) Foreign Application Priority Data

Aug. 6, 2020   (EP) .................................. 20305905

(51) Int. Cl.
*H02P 23/14* (2006.01)
*H02P 27/06* (2006.01)

(52) U.S. Cl.
CPC .............. *H02P 23/14* (2013.01); *H02P 27/06* (2013.01)

(58) Field of Classification Search
CPC .. H02P 23/14; H02P 27/06; H02P 1/26; H02P 1/029; H02P 6/22
See application file for complete search history.

(56) References Cited

U.S. PATENT DOCUMENTS

| 7,534,096 | B2* | 5/2009 | Schulz | E21B 43/128 417/44.11 |
|---|---|---|---|---|
| 7,558,699 | B2* | 7/2009 | Beck | F04D 13/10 702/182 |
| 9,976,555 | B2* | 5/2018 | Cheng | E21B 43/126 |
| 2005/0281680 | A1* | 12/2005 | Schulz | F04C 14/28 417/44.1 |
| 2006/0276999 | A1* | 12/2006 | Beck | F04D 15/0088 702/182 |

(Continued)

FOREIGN PATENT DOCUMENTS

WO    2019183407 A1    9/2019

OTHER PUBLICATIONS

European Search Report and Search Opinion dated Dec. 17, 2020 for corresponding European Patent Application No. EP20305905.0, 7 pages.

*Primary Examiner* — Thai T Dinh
(74) *Attorney, Agent, or Firm* — Locke Lord LLP (57) ABSTRACT

Examples include a method of control implemented in a variable speed drive for controlling an electric motor during backspin, wherein the method includes: determining, by the variable speed drive, a mechanical power value occurring at a backspin speed and an estimated load torque; determining, by the variable speed drive, a specific electrical losses profile occurring at a motor flux level, wherein the specific electrical losses profile coincides with the mechanical power value; determining, by the variable speed drive, a flux reference and a speed reference to be applied to the motor to coincide with the specific electrical losses profile; and controlling, by the variable speed drive, the backspin speed of the motor to maintain the coincidence with the specific electrical losses profile.

15 Claims, 7 Drawing Sheets

(56) References Cited

U.S. PATENT DOCUMENTS

| | | | |
|---|---|---|---|
| 2008/0247880 A1* | 10/2008 | Leuthen | F04D 15/0066 |
| | | | 417/44.11 |
| 2011/0097214 A1* | 4/2011 | Wentworth | F04B 49/02 |
| | | | 417/44.1 |
| 2011/0121767 A1* | 5/2011 | Nomura | H02P 3/18 |
| | | | 318/376 |
| 2013/0015790 A1* | 1/2013 | Kermarrec | H02P 21/36 |
| | | | 318/364 |
| 2016/0115959 A1* | 4/2016 | Cheng | F04C 13/008 |
| | | | 417/45 |

* cited by examiner

BACKSPINNING MOTOR CONTROL

FIELD OF THE INVENTION

This disclosure relates to a control method for an electric motor operating in backspin conditions. This disclosure also relates to a variable speed drive capable of controlling the electric motor operating in backspin conditions.

BACKGROUND

Systems involving a driving load, such as pumping systems used in the extraction of oil and other liquids, for example, may include an electric motor and a variable speed drive. The variable speed drive controls the amount of electrical energy sent to the motor. The motor thereafter converts the electrical energy into mechanical energy to drive the load, such as lifting a column of fluid in the case of pumping systems.

When the supply of electrical energy to the variable speed drive is cut off, such as during a power outage, the motor undertakes a breaking process. Initially, the momentum of the load causes the motor to continue spinning in a forward direction for a brief period of time. Thereafter, under the action of the driving load, the motor will cease spinning in a forward direction and start backspinning.

During such a breaking process, the motor's spin will generate electrical energy, which is sent back to the variable speed drive. This electrical energy can be used by the variable speed drive to keep running and control the backspin speed of the motor, thus preventing an uncontrolled backspin, which could reach speeds beyond a rated speed of the system.

The electrical energy generated by the motor during breaking may exceed the needs of the variable speed drive. In some cases, the excess energy may be dissipated through a resistor, transforming excess electrical energy into heat. However, this is an inefficient solution, as the dissipated energy is not exploited by the system. The purchase and maintenance of the resistor also increases the overall cost of the system.

SUMMARY

An object of the present disclosure is to maintain the backspinning motor in a state where the electrical energy produced by the motor is comparable to that used by the variable speed drive, in order to reduce or even suppress the need for energy dissipation.

The present disclosure describes a method of control implemented in a variable speed drive for controlling an electric motor during backspin, wherein the method comprises:
- determining, by the variable speed drive, a mechanical power value occurring at a backspin speed and an estimated load torque;
- determining, by the variable speed drive, a specific electrical losses profile occurring at a motor flux level, wherein the specific electrical losses profile coincides with the mechanical power value;
- determining, by the variable speed drive, a flux reference and a speed reference to be applied to the motor to coincide with the specific electrical losses profile;
- controlling, by the variable speed drive, the backspin speed of the motor to maintain the coincidence with the specific electrical losses profile.

Such a control method allows the backspinning motor to operate in a state where the power produced by the motor is comparable to a power used to keep the variable speed drive running and controlling the motor, taking into account electrical losses of the system. Little or no excess power is generated, and the system may not use a dissipating resistor.

Optionally, controlling the backspin speed of the motor comprises redetermining the specific electrical losses profile to update the flux reference. Updating the flux reference enables the motor to remain at a desired backspin speed while varying the electrical losses occurring. Updating the flux reference enables optimizing the coincidence in the case that the load torque varies.

Optionally, controlling the backspin speed of the motor comprises extracting, from the specific electrical losses profile, an electrical losses value occurring at the estimated load torque, and updating the speed reference to the backspin speed corresponding to the electrical losses value. Updating the speed reference enables a single specific electrical losses profile to be used for speed control. Such an update enables improving the coincidence in the case that the load torque varies.

Optionally, the method may comprise redetermining the specific electrical losses profile to update the flux reference, extracting, from the specific electrical losses profile, the electrical losses value occurring at the estimated load torque, and updating the speed reference to the backspin speed corresponding to the electrical losses value. The combination of updating both the flux reference and the speed reference may increase robustness and performance of backspin speed control.

Optionally, the method comprises determining a maximum electrical losses profile, and verifying that an electrical losses value occurring at the backspin speed and the estimated load torque are below the maximum electrical losses profile. Such verification ensures that the control of backspin speed operates within feasible electrical losses. A coincidence between the mechanical power value and a specific electrical losses profile may be found.

Optionally, controlling the backspin speed of the motor is carried out until a predefined threshold is reached. Such a configuration enables the control of backspin speed to be carried out until speed control becomes dispensable or motor operation is incompatible with the method.

Optionally, the predefined threshold is at least one from a group comprising: a minimum load torque, a minimum mechanical power value, a maximum backspin speed. A minimum load torque may indicate that the mechanical power produced to keep the variable speed drive running is provided at a backspin speed beyond a rated speed of the system. It may be preferable to switch off the variable speed drive. A minimum mechanical power value may indicate that the motor may not be subject to a high load torque. The motor may not accelerate should the motor be deprived of backspin speed control. A maximum backspin speed may indicate that the speed required to maintain coincidence between the specific electrical losses profile and the mechanical power value is beyond a rated speed of the system. It may be preferable to switch off the variable speed drive.

Optionally, the backspin speed is a predefined backspin speed. The predefined backspin speed may enable an operator to select a desired backspin speed to be applied to the motor during backspin. The predefined backspin speed may be selected based on the application. Optionally, the predefined backspin speed is chosen from a group comprising a slower, a medium and a faster backspin speed. Such options may facilitate selection of the predefined backspin speed.

Optionally, determining the specific electrical losses profile comprises selecting the specific electrical losses profile from a plurality of electrical losses profiles occurring at a plurality of motor flux levels. Limiting the number of available electrical losses profiles may facilitate determining a specific electrical losses profile.

Optionally, the plurality of motor flux levels range from 10% of a nominal flux to 150% of the nominal flux. Such motor flux levels may correspond to electrical losses profiles most likely to coincide with a mechanical power value.

Optionally, the method comprises selecting whether controlling the backspin speed of the motor includes changing the flux reference and/or the speed reference. Thus, an operator may select whether controlling the motor occurs at a fixed speed reference or whether the backspin speed may vary. An operator may also select whether the motor operates at a fixed flux reference or whether the flux may vary. The flexibility of the method is improved.

Optionally, the method comprises detecting, by the variable speed drive, the motor backspinning. Such detection enables the variable speed drive to implement the method when backspin occurs.

Optionally, the method comprises applying the method following a power outage. Power outage may be detected, and may indicate that the motor may backspin. Such detection enables the variable speed drive to implement the method when backspin occurs.

The present disclosure also describes a variable speed drive of an electric motor comprising a processor and a memory, the processor being configured to operate according to any of the methods herein described.

The present disclosure also describes a computer-readable storage medium comprising instructions which, when executed by a processor, cause the processor to carry out any of the methods hereby described.

DETAILED DESCRIPTION

This disclosure applies to the controlling of an electric motor by a variable speed drive. A variable speed drive should be understood in this disclosure as an electronic, virtual or software implemented control unit for an electric motor.

Figure 1:
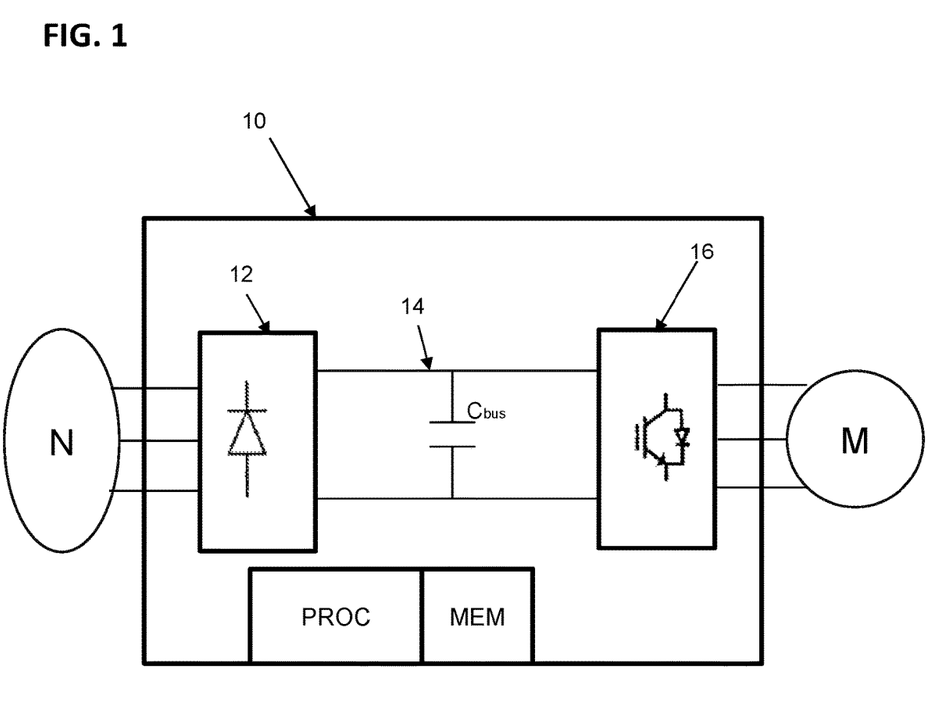
FIG. 1 schematically illustrates an example of a variable speed drive connected to an electrical network and a motor.

As in the example illustrated in FIG. 1, the variable speed drive 10 may be connected, on the one hand, to an electrical network N and, on the other hand, to the electric motor M. The variable speed 10 drive may comprise an inverter module 12, a DC (Direct Current) power bus 14 and a converter module 16.

The inverter module 12 may comprise a diode bridge configured to convert a 3-phase AC (Alternating Current) voltage provided by the electrical network N to a DC voltage. The DC voltage outputted by the inverter module 12 may be applied to the DC power bus 14.

The DC power bus 14 can comprise two power lines connected together by a bus capacitor $C_{bus}$ configured to stabilize the voltage of the bus 14. The output of the DC power bus 14 may be connected to the converter module 16.

The converter module 16 can comprise several switching arms each comprising power transistors, for example of the IGBT (Insulated Gate Bipolar Transistor) type. The converter module 16 may be intended to cut off the voltage supplied by the DC power bus 14, to achieve a variable output voltage applied to the electric motor M.

The variable speed drive 10 may comprise a processor PROC, the processor PROC being configured to operate according to any of the methods hereby described. Processor PROC may comprise electronic circuits for computation managed by an operating system.

The variable speed drive 10 may comprise a non-transitory machine-readable or computer readable storage medium, such as, for example, memory or storage unit MEM, whereby the non-transitory machine-readable storage medium is encoded with instructions executable by a processor such as processor PROC, the machine-readable storage medium comprising instructions to operate processor PROC to perform as per any of the example methods hereby described. A computer readable storage according to this disclosure may be any electronic, magnetic, optical or other physical storage device that stores executable instructions. The computer readable storage may be, for example, Random Access Memory (RAM), an Electrically Erasable Programmable Read Only Memory (EEPROM), a storage drive, and optical disk, and the like. As described hereby, the computer readable storage may be encoded with executable instructions according to the methods hereby described. Storage or memory may include any electronic, magnetic, optical or other physical storage device that stores executable instructions as described hereby.

The variable speed drive 10 according to this disclosure is connected to a driven load. By driven load, it should be understood that the motor M may drive the load, or reciprocally, the load may drive the motor M. When the motor drives the load, electrical power is consumed by the motor M to produce mechanical power. Reciprocally, when the load drives the motor M, the load applies a load torque on the motor to spin the motor M, to produce electrical power. Electrical power may be understood as a combination of voltage and current. Mechanical power may be understood as a combination of speed and torque.

Figure 2:
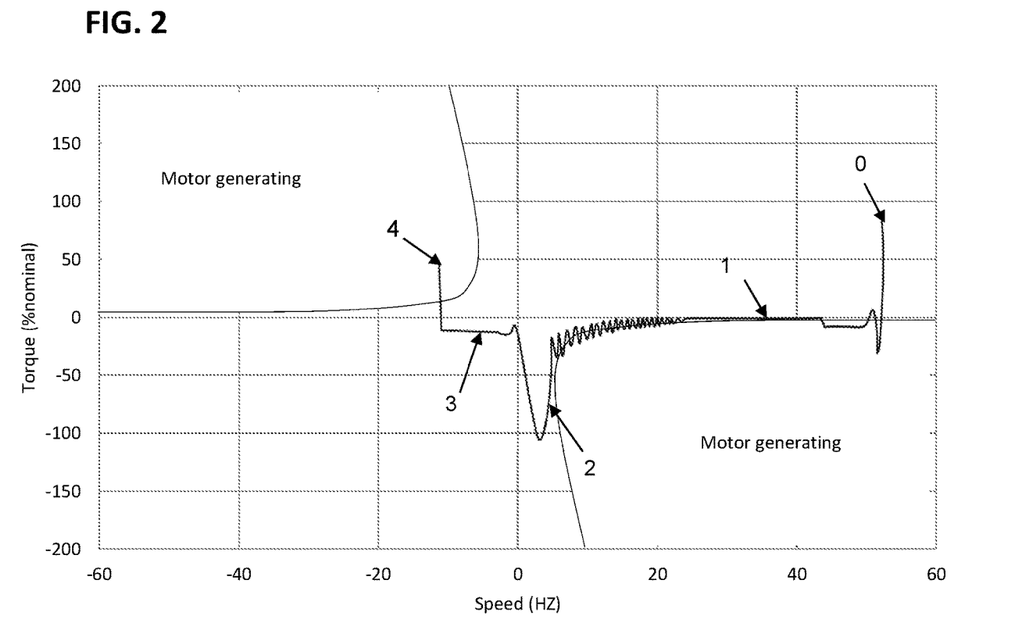
FIG. 2 illustrates schematically an example of a variable speed drive controlling backspin speed of a motor following an electrical power outage.

FIG. 2 illustrates the behavior of the electrical motor M under an electrical power outage. Electrical power outages occur when the voltage provided by the electrical network N to the variable speed drive 10 is cut off. A power outage may occur prior to the applying the methods described hereby. A power outage may be detected and trigger the methods described hereby.

Following an electrical power outage, occurring at (0) on FIG. 2, the torque produced by the electric motor M can drop. As illustrated at (1) on FIG. 2, the electric motor M may decelerate under the action of the load torque. The motor M may generate electrical power, which may be stored by the DC power bus capacitor $C_{bus}$, resulting in a rising DC bus voltage.

The motor M may reach an area close to a zero speed, at (2) on FIG. 2, wherein the electric motor M can no longer generate electrical power. The bus voltage may drop due to electrical losses occurring in the variable speed drive 10 and the electric motor M. To avoid a switching off of the variable speed drive 10, occurring when the bus voltage decrease below a critical level, the electrical power stored by the DC power bus capacitor $C_{bus}$ may be used to establish backspin. Backspin is to be understood as the reverse spinning of the motor M. Backspin may be established by the motor M producing mechanical power to increase the speed of the motor M in the reverse direction, as illustrated at (3) on FIG. 2.

During backspin, the electric motor M may accelerate under the action of the load torque. The motor M may generate electrical power, which may be stored by the bus capacitor $C_{bus}$, resulting in a rising DC bus voltage. An uncontrolled backspin may be undesired for a number of reasons. For example, such a reason may be reaching backspin speeds beyond a rated speed of the motor M, which could be damaging to equipment or unsafe to personnel. Some of the power generated by the electric motor M may be used by the variable speed drive 10 to control the backspin speed of the motor M. The control of the backspin speed may be achieved by the motor M producing mechanical power to oppose the action of the load. The mechanical power may form a resistive torque applied to maintain the backspin speed of the motor M at a desired value. This is illustrated at (4) on FIG. 2. However, some excess power may be generated, corresponding to the electrical power produced by the motor M during backspin that is not being stored or used by the variable speed drive 10 to control backspin speed.

Figure 3:
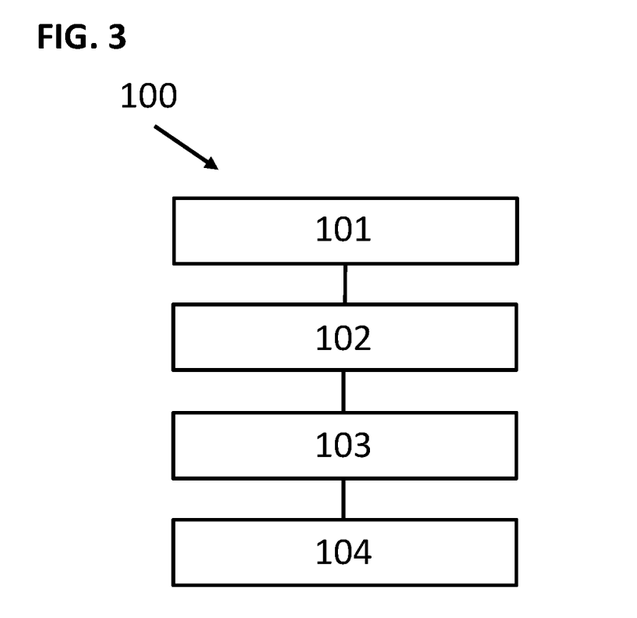
FIG. 3 illustrates an example method.

FIG. 3 illustrates an example of a method 100 according to this disclosure. The method illustrated in FIG. 3 is carried out for example by the variable speed drive 10 to control the electric motor M during backspin.

As illustrated in block 101, the method 100 comprises determining a mechanical power value $P_{mech}$. By mechanical power value $P_{mech}$, it is to be understood the power produced by the electric motor M. The mechanical power value may be calculated from a motor backspin speed $\omega$ and an estimated load torque $T_{est}$.

As illustrated in block 102, the method 100 comprises determining a specific electrical losses profile $P_{ref}$. By electrical losses, it is to be understood the power losses occurring at the motor M and the variable speed drive 10. Electrical losses may comprise motor losses and variable speed drive losses. Electrical losses may be calculated from motor characteristics. Electrical losses may vary with motor speed, torque and flux level. Thus, an electrical losses profile $P_{elec}$ may represent electrical losses occurring at a flux level for any motor speed and torque. The specific electrical losses profile $P_{ref}$ is the electrical losses profile for which the mechanical power value $P_{mech}$ may coincide with the electrical losses occurring. Thus, power produced by the electric motor M is comparable to that required by the variable speed drive 10 to stay running and control the backspin speed of the motor M.

As illustrated by block 103, the specific electrical losses profile $P_{ref}$ may be used to determine a flux reference $\varphi_{ref}$ and a speed reference corer. The flux reference $\varphi_{ref}$ may correspond to the flux level associated to the specific electrical losses profile $P_{ref}$. The speed reference $\omega_{ref}$ may correspond to the backspin speed at which the mechanical power value $P_{mech}$ coincides with the specific electrical losses profile $P_{ref}$.

As illustrated by block 104, the backspin speed of the motor M may be controlled to maintain the coincidence with the specific electrical losses profile $P_{ref}$. By controlling the backspin speed of the motor M, it is to be understood that the variable speed drive 10 may regulate the motor M to the achieve coincidence between the mechanical power value $P_{mech}$ and the specific electrical losses profile $P_{ref}$.

The method 100 illustrated in FIG. 3 enables the motor to backspin in a state where the mechanical power produced by the motor M is comparable to the electrical power required by the variable speed drive 10 to run and control the motor M. Little or no excess power may be produced, reducing or even suppressing the need for power dissipation.

In some examples, the load torque applied to the motor by the load may remain constant in time. In such cases, the mechanical power value $P_{mech}$ and the electrical losses occurring may also remain constant. The speed reference $\omega_{ref}$ and the flux reference $\varphi_{ref}$ may, in such examples, remain constant.

In some examples, the load torque may vary with time. In such cases, the mechanical power value $P_{mech}$ and electrical losses occurring may also vary with time. As a result, the mechanical power value $P_{mech}$ may not continuously coincide with the specific electrical losses profile $P_{ref}$.

Figure 4:
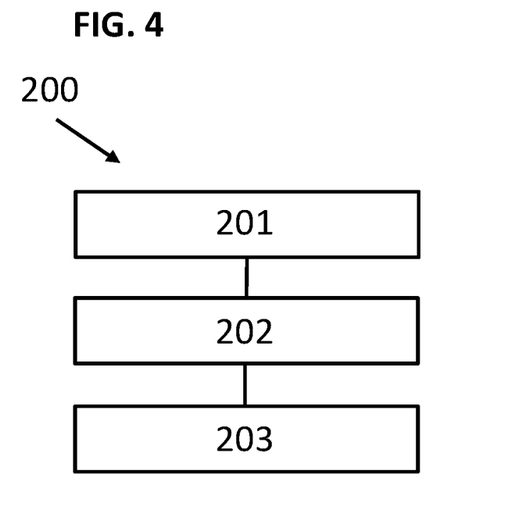
FIG. 4 illustrates another example method.

FIG. 4 illustrates a method 200, which may be carried out within block 104 as discussed in FIG. 3. Method 200 consists in updating the flux reference $\varphi_{ref}$. In the present disclosure, a same block may appear in different Figures, in which case such block is numbered in the same manner in the different Figures.

The method 200 comprises, at block 201, updating the mechanical power value $P_{mech}$ to account for a change in estimated load torque $T_{est}$. As illustrated at block 202, the specific electrical losses profile $P_{ref}$ may be redetermined. The redetermined specific electrical losses profile $P_{ref}$ may coincide with the updated mechanical power value $P_{mech}$. As illustrated at block 203, an updated flux reference ref may be determined from the redetermined specific electrical losses profile $P_{ref}$. Updating the flux reference $\varphi_{ref}$ can allow to maintain coincidence between the mechanical power value $P_{mech}$ and the specific electrical losses profile $P_{ref}$ even while the load torque applied to the motor M during backspin varies. The speed reference $\omega_{ref}$, in such examples, may remain constant.

Figure 5:
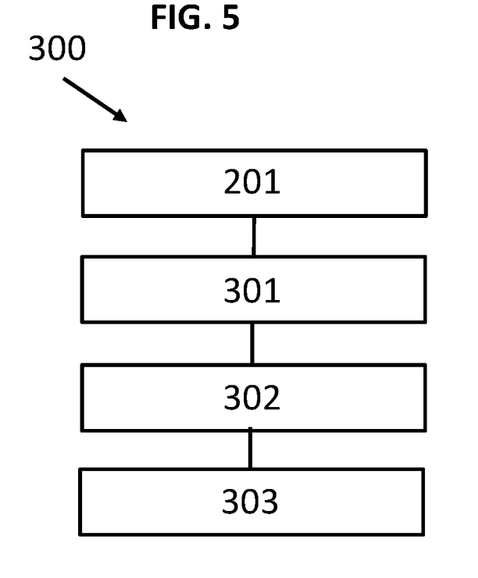
FIG. 5 illustrates yet another example method.

FIG. 5 illustrates a method 300, which may be carried out within block 104 as discussed in FIG. 3. Method 300 consists in updating the speed reference $\omega_{ref}$.

The method 300 also comprises block 201 of updating the mechanical power value $P_{mech}$. Method 300 further comprises, at block 301, extracting, from the specific electrical losses profile $P_{ref}$, an electrical losses value occurring at the estimated load torque $T_{est}$. The electrical losses value corresponds to the electrical losses occurring at the estimated load torque $T_{est}$ while following the specific electrical losses profile $P_{ref}$. At block 302, the backspin speed at which the electrical losses value is realized may be determined. The determined backspin speed may indicate a new speed reference $\omega_{ref}$ at which the updated mechanical power $P_{mech}$ may coincide with the specific electrical losses profile $P_{ref}$. As illustrated by block 303, the speed reference $\omega_{ref}$ may be updated from the determined speed of block 302. A single specific electrical losses profile $P_{ref}$ may be used to control the backspin speed of the motor M. Updating the speed reference $\omega_{ref}$ can allow to maintain coincidence between the mechanical power value $P_{mech}$ and the specific electrical losses profile $P_{ref}$ even while the load torque applied to the motor M during backspin varies. The flux reference $\varphi_{ref}$ may, in such examples, remain constant.

In some cases, both the flux reference $\varphi_{ref}$ and the speed reference $\varphi_{ref}$ may be updated. The speed reference $\omega_{ref}$ may be updated when the flux is below a threshold. The flux reference $\varphi_{ref}$ may be updated to limit or suppress speed oscillations at low backspin speeds. The combination of updating both the flux reference $\varphi_{ref}$ and the speed reference ford may increase robustness and performance of backspin speed control.

Figure 6:
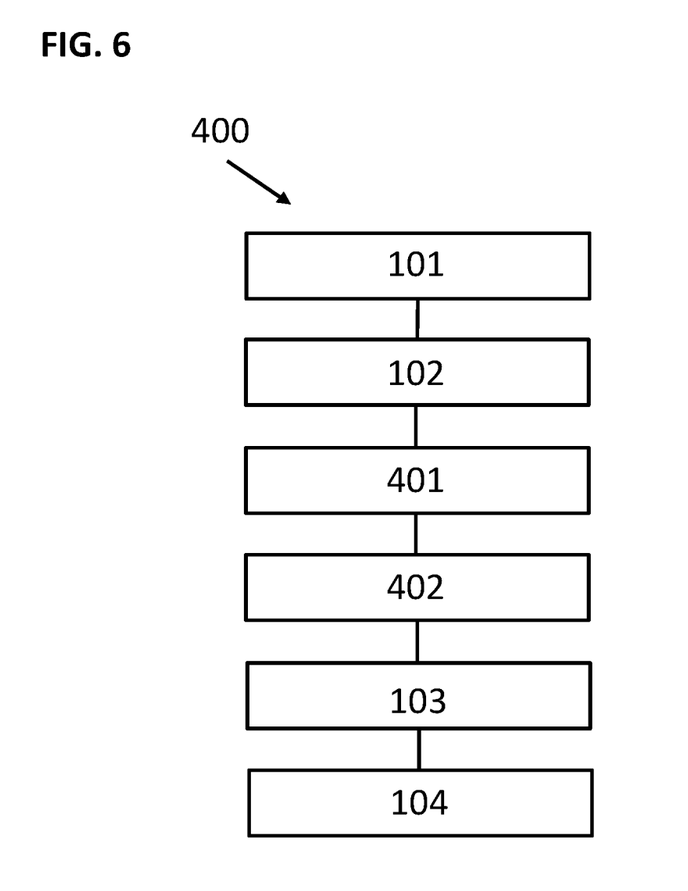
FIG. 6 illustrates yet another example method.

FIG. 6 illustrates a method 400 comprising blocks 101-104 as discussed in FIG. 3, wherein a maximum electrical losses profile $P_{max}$ is determined, at block 401. Electrical losses may be limited by the current which can be applied to the electric motor M. Thus, by maximum electrical losses profile $P_{max}$, it is to be understood the maximum achievable electrical losses at any given speed and torque, and for any flux level.

At block 402, the electrical losses value, comparable to the mechanical power value $P_{mech}$ through the application of method 100, may be compared to the maximum electrical losses profile $P_{max}$. The electrical losses value may be below the maximum electrical losses, suggesting that a specific electrical losses profile $P_{ref}$ can be found to coincide with the mechanical power value $P_{mech}$. The electrical losses value may be above maximum electrical losses, suggesting that no electrical losses profile $P_{elec}$ can coincide with the mechanical power value $P_{mech}$. The electrical losses value may be reduced, for example by lowering the speed reference $\omega_{ref}$. Thus, the mechanical power value $P_{mech}$ may also be reduced following method 100 and coincide with a specific electrical losses profile $P_{ref}$.

In some examples, block 104 of controlling the backspin speed of the motor may be carried out until a predefined threshold is met.

The predefined threshold may be a minimum load torque $T_{min}$. At the minimum load torque $T_{min}$, the backspin speed required to maintain coincidence with the specific electrical losses profile $P_{ref}$ may exceed the rated speed of the system. In other words, producing sufficient mechanical power to maintain the variable speed drive running may require an excessive backspin speed. In such a case, it may be preferable to remove control from the variable speed drive 10 and let the variable speed drive 10 power off.

The predefined threshold may be a minimum mechanical power value $P_{min}$. At the minimum mechanical power value $P_{min}$, a negligible load may be applied to the motor M. Backspin speed may remain at a speed below the rated speed of the motor M without control from the variable speed drive 10.

The predefined threshold may be a maximum backspin speed $\omega_{max}$. Reaching the maximum backspin speed may indicate that a low load torque is applied to the motor. At the maximum backspin speed $\omega_{max}$, the backspin speed required to maintain coincidence with the specific electrical losses profile may exceed the rated speed of the system. In such a case, it may be preferable to remove control from the variable speed drive 10 and let the variable speed drive 10 power off.

In some examples, the methods described herein may comprise selecting whether controlling the backspin speed of the motor updates the speed reference $\omega_{ref}$, according to method 300, or the flux reference $\varphi_{ref}$, according to method 200. In some cases, the selection may be done by an operator. Selection may depend on the application. Selection may improve the flexibility of the methods described herein.

In some examples, the methods described herein may comprise detecting the motor M backspinning. Detection of backspin occurrence may trigger controlling of the backspin speed of the motor M. Detection of backspin may be achieved by a measured speed from speed or current measurements at the motor M.

Figure 7:
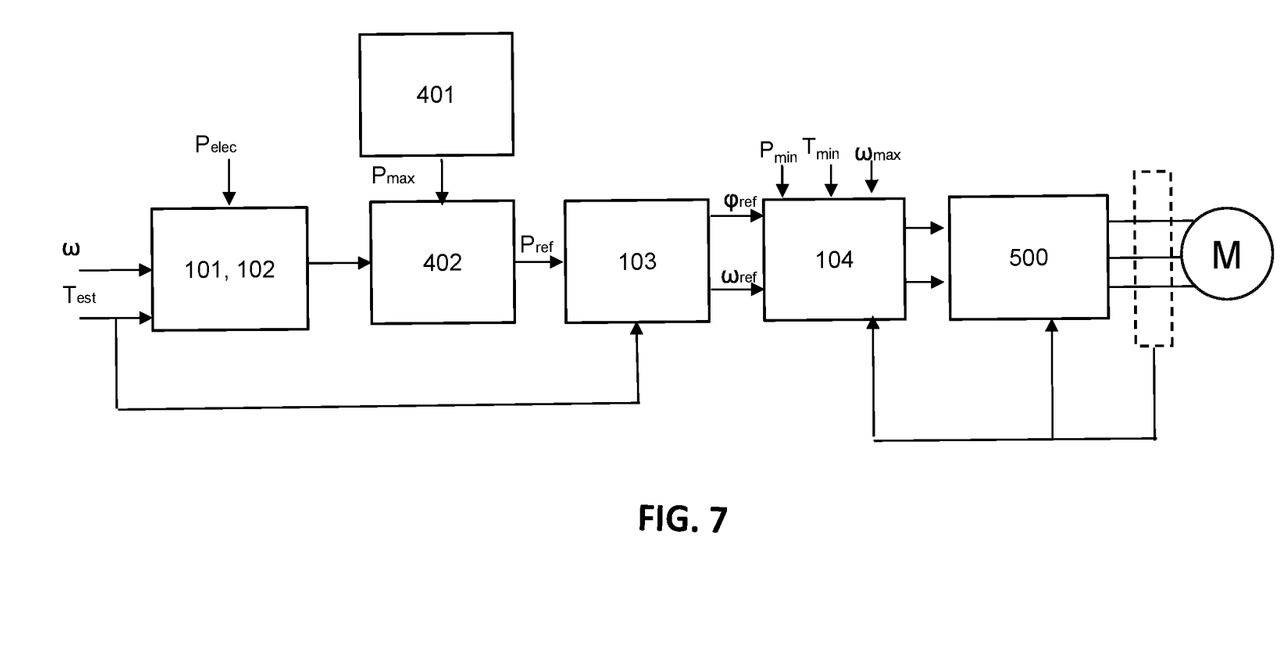
FIG. 7 illustrates an example of a control system for the implementation of the methods of the present disclosure.

FIG. 7 illustrates a control system configured to carry out the methods described herein.

As illustrated, the mechanical power value P mech may be determined at block 101 from the backspin speed ω and the estimated load torque $T_{est}$. The estimated load torque $T_{est}$ may be determined from measurements at the motor. The estimated load torque $T_{est}$ may be determined by taking current measurements and calculating the estimated load torque $T_{est}$. The estimated load torque $T_{est}$ may be determined from taking torque measurements at the motor. Measurements may be taken by sensors at the motor.

In some examples, the backspin speed ω may be a predefined backspin speed $\omega_{assigned}$. The predefined backspin speed $\omega_{assigned}$ may be assigned depending on a desired backspin speed of the motor M. The predefined backspin speed $\omega_{assigned}$ may be chosen depending on the application. Predefined backspin speed $\omega_{assigned}$ may be chosen by an operator. Predefined backspin speed $\omega_{assigned}$ may, for example, be chosen between a medium, faster and slower backspin speed. In such cases, the predefined backspin speed $\omega_{assigned}$ may be comparable to the speed reference $\omega_{ref}$. The motor may operate at the predefined backspin speed $\omega_{assigned}$. Motor control at block 104 may be achieved by applying method 200.

In some examples, the backspin speed ω may be an estimated backspin speed. The estimated backspin speed may be established by measurements taken at the motor M. Measurements may be taken by sensors at the motor.

As illustrated, determining the specific electrical losses profile $P_{ref}$ at block 102 may comprise identifying the specific electrical losses $P_{ref}$ profile from a plurality of electrical losses profiles $P_{ref}$. The electrical losses profiles $P_{elec}$ may correspond to the electrical losses profiles occurring between 10% and 150% of a nominal flux. The electrical losses profiles $P_{elec}$ may correspond to the electrical losses profiles occurring between 20% and 120% of a nominal flux. The nominal flux may correspond to a rated flux of the electric motor M. The electrical losses occurring between 10% and 150% of the nominal flux may correspond to likely mechanical power values. The electrical losses occurring between 10% and 150% of the nominal flux may also correspond to achievable motor flux levels to preserve the electric motor M.

In some examples, determining the specific electrical losses profile $P_{ref}$ may comprise calculating the specific electrical losses profile $P_{ref}$ from the determined mechanical power value $P_{mech}$, motor data and the estimate load torque $T_{est}$.

In addition, block 500 illustrates the calculation, by the variable speed drive 10, of the voltages to be applied to the motor M. Voltages may be calculated using vector control laws. The speed reference $\omega_{ref}$ and the flux reference $\varphi_{ref}$ may be converted to a flux producing voltage and a torque producing voltage. The flux producing voltage and a torque producing voltage may be converted to 3 phase voltages to be sent to each motor winding. Current measurements at the motor M may be used in voltage calculations to improve the accuracy of voltage calculations.

Figure 8:
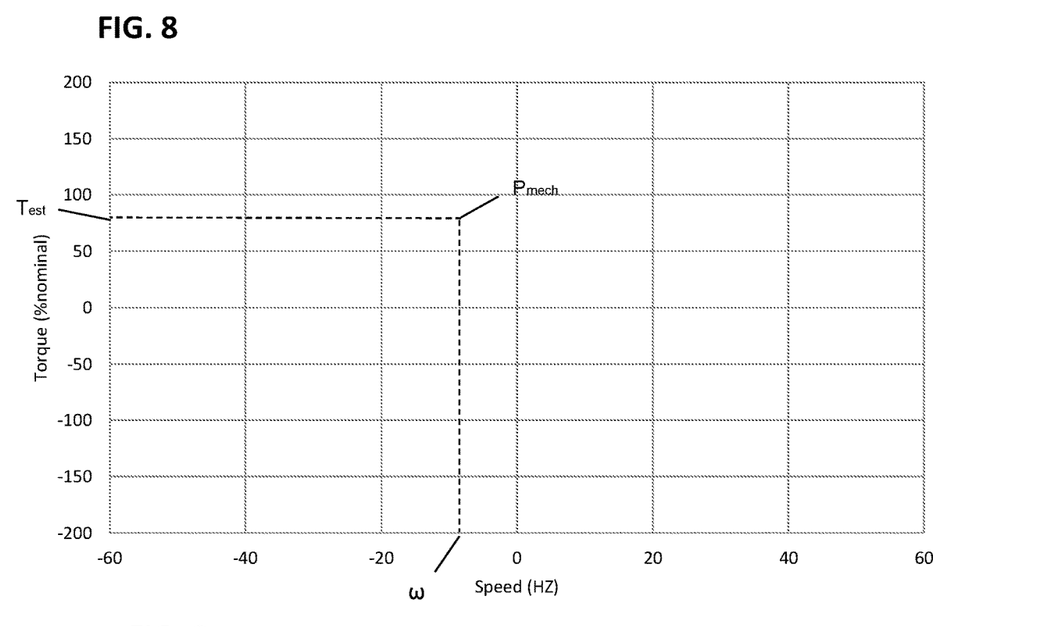
FIG. 8 illustrates an example of a step illustrated in FIG. 7.

FIG. 8 illustrates an example of calculating the mechanical power value $P_{mech}$. The backspin speed ω may be estimated or assigned, in this example, as −10 Hz, or approximately 62 rad/s. The estimated load torque $T_{est}$ may be estimated, in this example, as 80% of a nominal torque. If the motor M nominal torque is 135 Nm in this example, the estimated load $T_{est}$ may be 108 Nm. Thus the mechanical power value $P_{mech}$ may be calculated as 6.7 kW.

Figure 9:
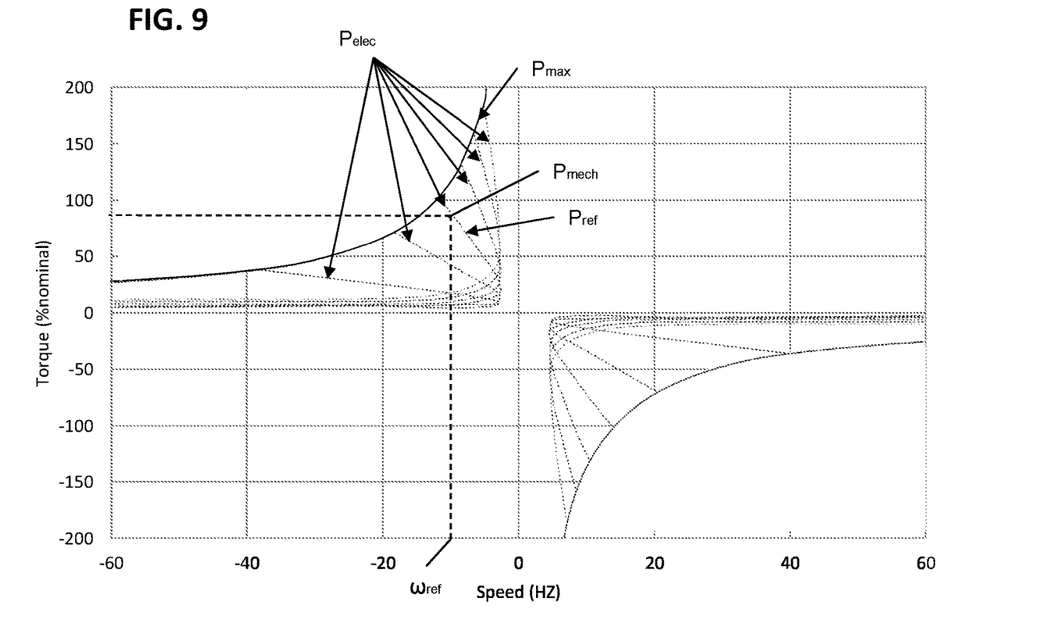
FIG. 9 illustrates an example of another step shown in FIG. 7.

FIG. 9 illustrates an example identifying a specific electrical losses profile $P_{ref}$ and using the maximum electrical losses profile $P_{max}$. As illustrated, six electrical losses profiles $P_{elec}$ have been determined, as a function of speed and torque, for flux levels ranging from 20% of the nominal flux to 120% of the nominal flux. The maximum electrical losses profile $P_{max}$ illustrates the maximum achievable electrical losses. In this example, the maximum electrical losses occurring at the backspin ω speed of −10 Hz are 9.3 kW. In this case, the mechanical power value $P_{mech}$ of 6.7 kW is inferior to maximum electrical losses. The specific electrical losses profile $P_{ref}$ coinciding with the mechanical power value $P_{mech}$ at the backspin speed of −10 Hz is, in this case, the electrical losses profile $P_{elec}$ at 80% of the nominal flux. The flux reference of 80% the nominal flux may be applied to the motor M. In addition, in this example, the speed reference $ω_{ref}$ may be set as 10 Hz, comparable to the backspin speed ω.

Figure 10:
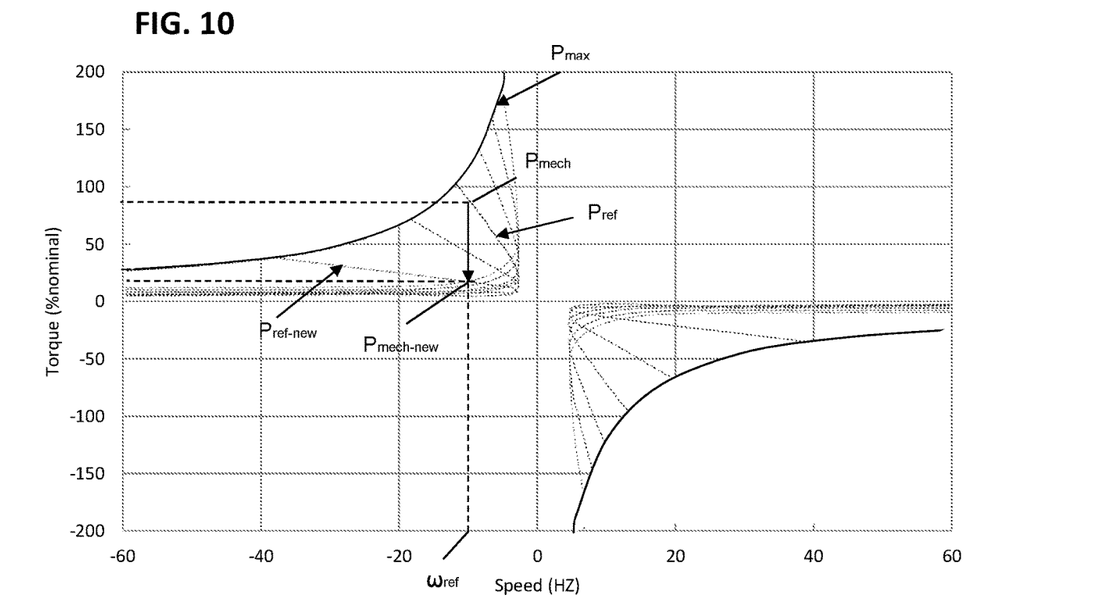
FIG. 10 illustrates an example of another step shown in FIG. 7.
Figure 11:
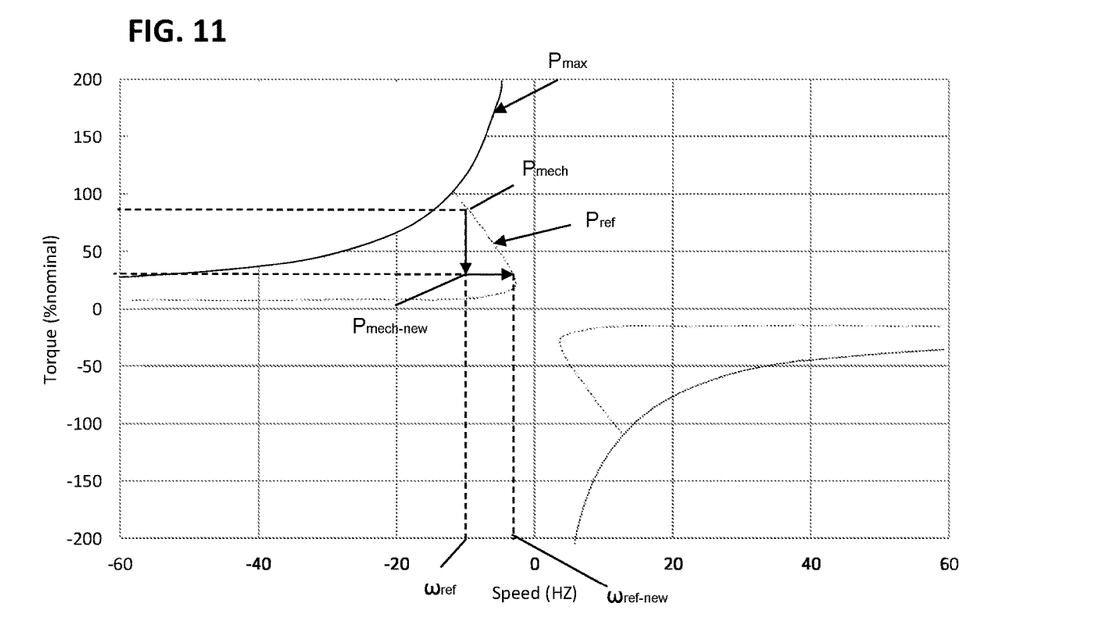
FIG. 11 illustrates another example of a step of FIG. 7.

FIGS. 10 and 11 illustrate examples wherein the estimated load torque $T_{est}$ is reduced from 80% of the nominal torque to 25% of the nominal torque. The change in estimated load torque $T_{est}$ leads to an updated mechanical power value $P_{mech-new}$. The updated mechanical power value $P_{mech-new}$ may be calculated from the speed reference $ω_{ref}$ and the reduced estimated load torque $T_{est}$. According to this example, the new mechanical power value $P_{mech-new}$ may be found to be 2.1 kW. However, the electrical losses occurring at the speed reference value $ω_{ref}$ remain at 9.3 kW. The motor M may be generating an excess power of 7.2 kW.

FIG. 10 illustrates an example wherein the flux reference $ω_{ref}$ is updated. The variable speed drive 10 may select a new specific electrical losses curve $P_{ref}$. In this example, the new specific electrical losses profile $P_{ref}$ coinciding with the new mechanical power value $P_{mech-new}$ is the electrical losses profile $P_{elec}$ at 20% of the nominal flux. The speed reference $ω_{ref}$ may remain as 10 Hz, comparable to the previous backspin speed ω. The updated flux reference of 20% the nominal flux may be applied to the motor M.

FIG. 11 illustrates an example wherein the speed reference $ω_{ref}$ is updated. The variable speed drive 10 may determine a new speed reference $ω_{ref-new}$. According to the specific electrical losses profile $P_{ref}$ at 80% of the nominal flux, electrical losses of 2.1 kW may occur at a new speed reference $ω_{ref-new}$ of −5 Hz. The flux reference may remain as 20% the nominal flux. The updated speed reference of −5 Hz may be applied to the motor M.

The invention claimed is:

1. A method of control implemented in a variable speed drive for controlling an electric motor during backspin, wherein the method comprises:
   determining, by the variable speed drive, a mechanical power value corresponding to power produced by the motor occurring at a backspin speed and an estimated load torque;
   determining, by the variable speed drive, a specific electrical losses profile occurring at a motor flux level, wherein the specific electrical losses profile is an electrical losses profile for which electrical losses coincide with the mechanical power value such that little or no excess power is produced by the motor;
   determining, by the variable speed drive, a flux reference and a speed reference to be applied to the motor in order for the mechanical power value to coincide with the specific electrical losses profile such that little or no excess power is produced by the motor; and
   controlling, by the variable speed drive, the backspin speed of the motor to maintain the coincidence of the mechanical power value with the specific electrical losses profile such that little or no excess power is produced by the motor.

2. The method according to claim 1, wherein controlling the backspin speed of the motor comprises redetermining the specific electrical losses profile to update the flux reference.

3. The method according to claim 1, wherein controlling the backspin speed of the motor comprises extracting, from the specific electrical losses profile, an electrical losses value occurring at the estimated load torque, and updating the speed reference to the backspin speed corresponding to the electrical losses value.

4. The method according to claim 1, comprising determining a maximum electrical losses profile, and verifying that an electrical losses value occurring at the backspin speed and the estimated load torque are below the maximum electrical losses profile.

5. The method according to claim 1, wherein controlling the backspin speed of the motor is carried out until a predefined threshold is reached.

6. The method according to claim 5, wherein the predefined threshold is at least one from a group comprising: a minimum load torque, a minimum mechanical power value, a maximum backspin speed.

7. The method according to claim 1, wherein the backspin speed is a predefined backspin speed.

8. The method according to claim 7, wherein the predefined backspin speed is chosen from a group comprising a slower, a medium and a faster backspin speed.

9. The method according to claim 1, wherein determining the specific electrical losses profile comprises selecting the specific electrical losses profile from a plurality of electrical losses profiles occurring at a plurality of motor flux levels.

10. The method according to claim 9, wherein the plurality of motor flux levels range from 10% of a nominal flux to 150% of the nominal flux.

11. The method according to claim 1, further comprising selecting whether controlling the backspin speed of the motor includes changing the flux reference and/or the speed reference.

12. The method according to claim 1, further comprising detecting, by the variable speed drive, the motor backspinning.

13. The method according to claim 1, wherein the method comprises applying the method following a power outage.

14. A variable speed drive of an electric motor comprising a processor and a memory, the processor being configured to operate according to claim 1.

15. A non-transitory computer-readable storage medium comprising instructions which, when executed by a processor, cause the processor to carry out the method of claim 1.

* * * * *